H. YOUNG.
APPARATUS FOR PREVENTING METAL INCRUSTATION.
APPLICATION FILED OCT. 2, 1911.
1,032,723.
Patented July 16, 1912.
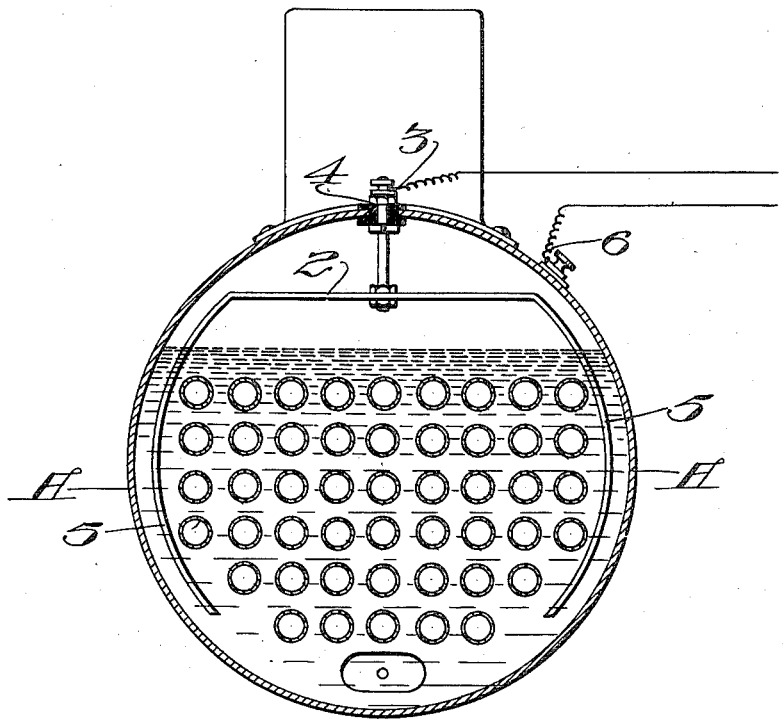

UNITED STATES PATENT OFFICE.

HENRY YOUNG, OF SAN DIEGO, CALIFORNIA, ASSIGNOR OF ONE-THIRD TO CLAUS SPRECKELS AND JAMES E. WADHAMS, BOTH OF SAN DIEGO, CALIFORNIA.

APPARATUS FOR PREVENTING METAL INCRUSTATION.

1,032,723.   Specification of Letters Patent.   Patented July 16, 1912.

Application filed October 2, 1911. Serial No. 652,323.

*To all whom it may concern:*

Be it known that I, HENRY YOUNG, a citizen of the United States, residing at San Diego, in the county of San Diego and State of California, have invented new and useful Improvements in Apparatus for Preventing Metal Incrustation, of which the following is a specification.

This invention relates to a method of preventing the incrustation of metals which are immersed in water, or other liquids, due to galvanic action, and refers more particularly to a method of preventing the incrustation of metals immersed in sea water, such as marine vessels and parts thereof, and also in boilers and the like.

It is well known and has been recognized for some time past, that metals immersed in water or other liquid and particularly in sea water, are subjected to incrustation owing to galvanic action.

The object of my invention is to provide a simple method, whereby this galvanic action is entirely nullified, and the consequent incrustation avoided. I accomplish this object by providing a subsidiary and auxiliary current of higher electromotive force than the current generated by the electrogalvanic action; such auxiliary current being connected to an auxiliary electrode, which forms one pole or cathode, while the metal or metals to be protected form the other pole or anode.

In carrying my invention into effect, the metal or metals now subjected to incrustation by galvanic action are connected to the negative pole of a dynamo or other source of electric power. The other pole of the dynamo or source of electric power is connected to a metal plate or plates, preferably of iron, which are immersed in the water, but insulated from the metal or metals to be protected, when a current is generated in a dynamo or other source of electric power of higher (E. M. F.) electromotive force than the current generated by the electro galvanic action, it is found that such electrogalvanic action entirely ceases.

The metal or metals attached or connected to the negative pole both form the cathode and are brought into parallel with one another, instead of opposed electrically, and consequently no incrustation takes place while the incrustation and deposit of the metal is entirely centered in the auxiliary plate or plates attached to the positive pole of the dynamo, or other source of electrical power.

In the accompanying drawing the view is a section of the boiler provided with means for carrying out my invention.

A represents the shell of a boiler, and 2 is an iron frame which is located in the upper part of the boiler and preferably above the high water level. Connected with this frame or plate is a conductor 3 which enters through an opening in the boiler and this opening is insulated as at 4. From the ends, or other convenient portion of the plate 2, electrodes 5 extend in curved lines around the interior of the boiler and out of contact with the shell. The other terminal 6 connects with the boiler as shown, the terminal being in circuit and the current of electricity is received from any proper generator or source. The current thus passing through the terminal 6, boiler shell A, thence through the water in the boiler to the arms or plates 5, and thence through the terminal 3.

A single application is here illustrated, but it will be manifest that the electrodes 5 may be constructed and placed in any suitable or desired position, depending upon the character of the plates to be protected.

Having thus described my invention what I claim and desire to secure by Letters Patent is;—

In an apparatus to prevent boiler incrustation, a plate extending horizontally within the upper part of the boiler and out of contact therewith, curved arms extending downward from the edges of said plate, and substantially concentric with the walls of the boiler shell, an anode electrical terminal connected with the exterior of the boiler, and a cathode terminal attached to the plate, extending outwardly through the shell, and an insulating medium located in the shell and through which the terminal connection passes from the plate.

In testimony whereof I have hereunto set my hand in the presence of two subscribing witnesses.

HENRY YOUNG.

Witnesses:
JOHN H. HERRING,
CHARLES EDELMAN.